Feb. 13, 1934.   F. B. WALDRON   1,946,955
GLASS POLISHING TOOL
Filed Sept. 9, 1933   2 Sheets-Sheet 1

Inventor.
Frederic Barnes Waldron
BY
Morrison, Kennedy & Campbell
Attorneys.

Feb. 13, 1934. F. B. WALDRON 1,946,955
GLASS POLISHING TOOL
Filed Sept. 9, 1933 2 Sheets-Sheet 2
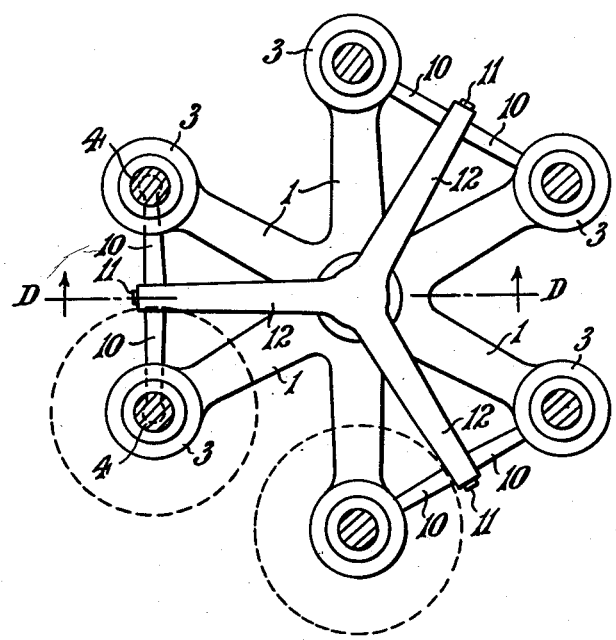
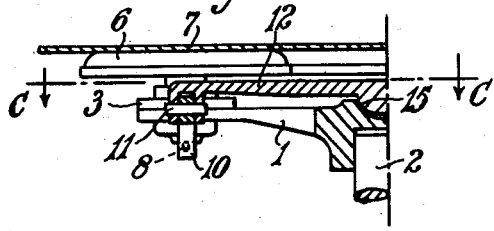

Patented Feb. 13, 1934

1,946,955

UNITED STATES PATENT OFFICE

1,946,955

GLASS POLISHING TOOL

Frederic Barnes Waldron, Prescot, England, assignor to Pilkington Brothers Limited, Liverpool, England, a British company Application September 9, 1933, Serial No. 688,723, and in Great Britain September 22, 1932

6 Claims. (Cl. 51—195)

This invention relates to polishing tools for flat glass and has for its object an improved form of polishing tool.

The invention relates to the particular type of polishing tool in which a plurality of polishing tools is mounted on a frame.

In certain polishing tools the frame is rotated or allowed to rotate and the polishing tools (generally felt-covered discs) are usually free to rotate on their own axes. In other polishing tools the frame is oscillated and carries a plurality of felt-covered pads.

The invention will be described as applied to the former type of tool, but it is applicable to the latter.

The former, or rotary, type of tool commonly operates on the upper surface of horizontally placed glass plates or strips, and then each polishing tool, which is free to move up and down in the frame, rests on the glass with a pressure due to its weight.

When, however, the under surface of horizontally placed glass or either surface of vertically placed glass is to be polished, the requisite pressure of the polishing tools on the glass cannot be derived from their weight and must be provided by a yielding or unyielding connection with the frame.

According to the invention, the polishing tools are pressed against the glass by pressure applied by the frame at a single point of a linkage system connecting the tools, whereby the pressure is distributed between the tools in any desired proportions.

In the accompanying drawings:—

Figure 3 is a horizontal section of an alternative form of polishing tool along the line C—C of Figure 4, and Figure 4 is a half vertical section of the same along the line D—D of Figure 3.

Figure 1:
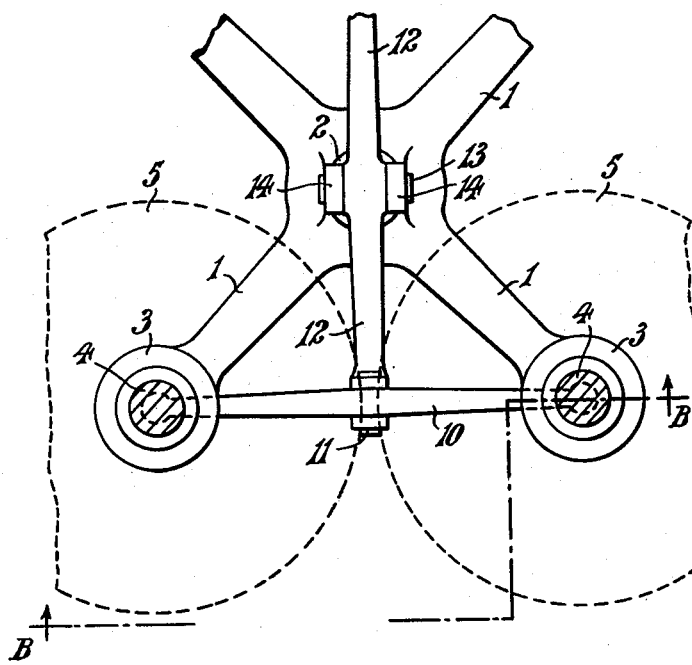
Figure 1 is a horizontal section of a polishing tool (partly broken away) adapted to operate on the underside of horizontally placed glass, the section being along the line A—A of Figure 2.
Figure 2:
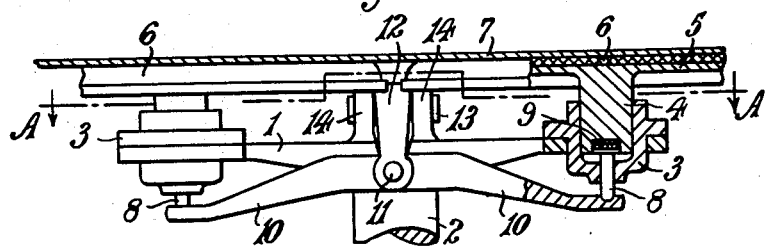
Figure 2 is a vertical section of the same along the line B—B of Figure 1.

Referring to Figures 1 and 2, the frame 1, fixed on the shaft 2 is adapted to rotate and either to be pressed towards the glass with any desired pressure or to be held in position relatively to the plane of the glass so as to withstand pressure applied to it by the glass. Polishing tools with frames so mounted are described and shown in Letters Patent No. 1,729,498 and need not be further described.

A casing 3 is fixed to the extremity of each of the four arms of the frame 1. The pin 4 of each polishing tool is free to rotate in and to move up and down in its casing 3. The pin 4 is attached to a disc 5 covered with felt 6, the upper surface of which operates on the glass 7.

In Figure 1 two of the felt covered discs 5 are partly indicated by dotted lines. The other two, which are not shown, are symmetrically placed about the shaft 2.

A pin 8 is adapted to slide in the lower end of each casing 3. Its upper end bears against the pin 4 through a ball bearing 9. The lower ends of the two pins 8 bearing on the pins 4 of the two polishing tools shown bear against the two ends of an arm 10, pivoted at its centre 11 to one end of an arm 12, which is pivoted at its centre at 13 to lugs 14 on the frame 1, on a line passing through the axis of rotation of the frame.

The above described construction of pins 8 and arms 10 and 12 is repeated symmetrically about the pivot 13 in conjunction with the two polishing tools not shown.

The two arms 10 and 12 with their pivots 11 and 13, constitute a linkage system connecting the frame 1 with the four polishing tools, with reference to movements perpendicular to the glass, and pressure applied by the frame 1 towards the glass is equally distributed by this linkage system to the four polishing tools. Similarly, if the frame 1 is held against movement perpendicular to the glass, any pressure applied by the glass (by means, for example, of another polishing tool operating on the upper side) is equally distributed by the linkage system among the four polishing tools.

Figures 3 and 4 show a similar linkage system applied to a frame having six polishing tools. The same reference figures as in Figures 1 and 2 are used for corresponding parts.

The frame 1 has six arms to which are fixed the six casings 3 of the polishing tools. These are similar to the polishing tool shown in Figure 2 and the pins 8 (one is shown in dotted lines in Figure 4) of two adjacent tools bear against the ends of an arm 10, pivoted at its centre at 11 to an arm 12 of a three-armed spider mounted in a ball-and-socket joint 15 in the frame 1, on its axis.

The other two pairs of polishing tools are similarly connected to the other two arms 12 of the three-armed spider, by arms 10.

The linkage system consisting of the arms 10 and 12, with pivots 11 and ball-and-socket joint 15 operates in the same way as the linkage system described with reference to Figures 1 and 2.

By constructions of like nature, the polishing tools, whatever their number and whether rotary discs or non-rotating pads, may be connected by a linkage system to their frame, in such a way that pressure applied by the frame towards the glass at a single point (for example, the pivot 13 or the ball-and-socket joint 15) is equally distributed among all the polishing tools.

Polishing tools on any one frame are usually of the same size, but if certain of them are of smaller area than the others, the pressure is distributed among the polishing tools so that the pressure per square inch at each tool is equal, by suitably choosing the pivoting points of the linkage members connecting the tools of different areas. Similarly, by suitably choosing the pivoting points of the linkage members, a linkage system may be constructed for an odd number of polishing tools.

It will be seen that the above described polishing tools provide an operative surface which, as a whole, is unyielding though parts of it may yield relatively to other parts. The tools, therefore, serve to provide an unyielding support for the glass in polishing apparatus such as that described in the above-mentioned Letters Patent.

The invention is applicable to polishing tools operating on the upper surface of horizontally placed glass, where it is desired to exercise a greater pressure on the glass than is given by the weight of the polishing tools.

In this specification and the claims, the phrase "pressure applied by the frame" is to be taken to include the re-active pressure exercised by a frame which is held against movement perpendicular to the glass.

Having described my invention, I declare that what I claim and desire to secure by Letters Patent is:—

1. In apparatus for polishing plate glass, the combination of a plurality of polishing tools, a rotatable frame in which the tools are supported with a capacity for movement in a direction perpendicular to the surface of the glass, and a linkage system pivotally connected at one point to the frame, said linkage system comprising arms, the ends of which are adapted to bear against the respective tools and whereby pressure applied to any one tool is transmitted to the other tools of the plurality.

2. In apparatus for polishing flat glass, the combination with at least three polishing tools of a rotatable frame in which the tools are supported with a capacity for movement perpendicular to the surface of the glass, and a linkage system mutually connecting the tools, said linkage system comprising a main member pivotally connected to the frame and at least one other member pivotally connected to the said main member and adapted to bear against two tools, one on each side of its pivotal point.

3. In apparatus for polishing flat glass, the combination with a plurality of pairs of tools, of a rotatable frame in which the tools are supported with a capacity for movement in a direction perpendicular to the surface of the glass and a linkage system mutually connecting the tools, said linkage system comprising a main member pivotally connected to the frame and another member appropriate to each pair of tools pivotally connected to the main member and adapted to bear against one tool of the respective pair on each side of its pivotal point.

4. In apparatus for polishing plate glass, the combination of a plurality of polishing tools, a rotatable frame in which the tools are supported, guiding means on the frame constraining the movement of the tools relatively to the frame to a direction perpendicular to the glass, and a linkage system pivotally connected to the frame on a line passing through the axis of rotation of the frame, said linkage system comprising arms, the ends of which are adapted to bear against the respective tools and whereby pressure applied to any one tool is transmitted to the other tools of the plurality.

5. In apparatus for polishing flat glass, the combination with at least three polishing tools of a rotatable frame in which the tools are supported, guiding means on the frame constraining the movement of the tools relatively to the frame to a direction perpendicular to the glass and a linkage system mutually connecting the tools, said linkage system comprising a main member pivotally connected to the frame on a line passing through the axis of rotation of the frame, and at least one other member pivotally connected to the said main member and adapted to bear against two tools, one on each side of its pivotal point.

6. In apparatus for polishing flat glass, the combination with a plurality of pairs of tools, of a rotatable frame in which the tools are supported, guiding means on the frame constraining the movement of the tools relatively to the frame to a direction perpendicular to the glass and a linkage system mutually connecting the tools, said linkage system comprising a main member pivotally connected to the frame on a line passing through the axis of rotation of the frame, and another member appropriate to each pair of tools pivotally connected to the main member and adapted to bear against one tool of the respective pair on each side of its pivotal point.

FREDERIC BARNES WALDRON.